PULSE PRODUCTION APPARATUS

Filed Aug. 31, 1953

INVENTOR.
GEORGE W. GRAY

BY [signature]

ATTORNEY

United States Patent Office 2,908,815

Patented Oct. 13, 1959

2,908,815

PULSE PRODUCTION APPARATUS

George W. Gray, Lambertville, N.J., assignor to Radio Corporation of America, a corporation of Delaware Application August 31, 1953, Serial No. 377,317

2 Claims. (Cl. 250—27)

This invention relates to pulse generators generally, and more particularly to generators for providing narrow pulses in response to sine wave driving voltages.

It is an object of the present invention to provide a novel method and an improved means for generating sharp pulses.

Another object of the invention is to provide a novel method of and an improved means for generating sharp pulses in response to two or more sine waves.

Still another object of the invention is to provide a novel method of and an improved means for obtaining output pulses from a generator at a frequency harmonically related to the sine wave input.

Yet another object of this invention is to provide a novel method of and an improved means for sampling signal voltages at a radio-frequency rate.

In its most general aspect, the invention comprises means for applying two phase-displaced sine waves to a pulse producing vacuum tube including a control electrode, in such a manner that unless the amplitude of both sine waves is above the cutoff potential of the tube, the tube will not conduct. Should either one of the waves decrease below this level, the tube is rendered nonconductive. In one form of the invention two unidirectional current conducting devices or diodes have their plates tied together and coupled directly to the input control electrode of a pulse producing tube. Separate waves of varying amplitude are applied to the respective cathodes of each diode. When the potential on the cathodes of both diodes exceeds the cutoff potential of the pulse producing tube, the latter will start to conduct. Whenever the wave applied to either diode falls below the cutoff potential, the pulse producing tube will be cut off. By adjusting the phases of the two voltage waves so that one wave is about to exceed the cutoff potential, and the other wave is about to decrease below the cutoff potential at a short time thereafter, it is possible to obtain a sharp pulse from the pulse producing tube.

In another form of the invention two or more waves of varying amplitude having the same frequency and approximately 180° out of phase are applied to the two diodes. There will exist points in time common to both waves at which the instantaneous value of both waves is above cutoff of the pulse producing tube. With the proper mutual relation of the D.-C. axes of both waves, the period of time existing between the instant in which both waves exceed cutoff and a later instant in which at least one of them falls below cutoff, pulses having an extremely short time base can be produced. In this particular form of the invention, sharp pulses are produced twice within each cycle of the input sine waves. If the D.-C. axes of the two waves are the same and this common axis is above the cutoff level of the pulse producing tube, a frequency doubling effect is obtained. Should this doubling effect not be desired, appropriate means for cancelling alternate pulses may be introduced.

A signal voltage may be introduced into the pulse producing vacuum tube via an additional electrode, and the embodiments described above will function as sampling or gating circuits, sampling the signal voltage at a frequency equal to or double that of the sine wave input.

Other objects and advantages of the present invention will become more apparent from a reading of the following specification and claims particularly when considered with the drawing wherein:

Figures 1, 2, 3, 4, 5, 6:
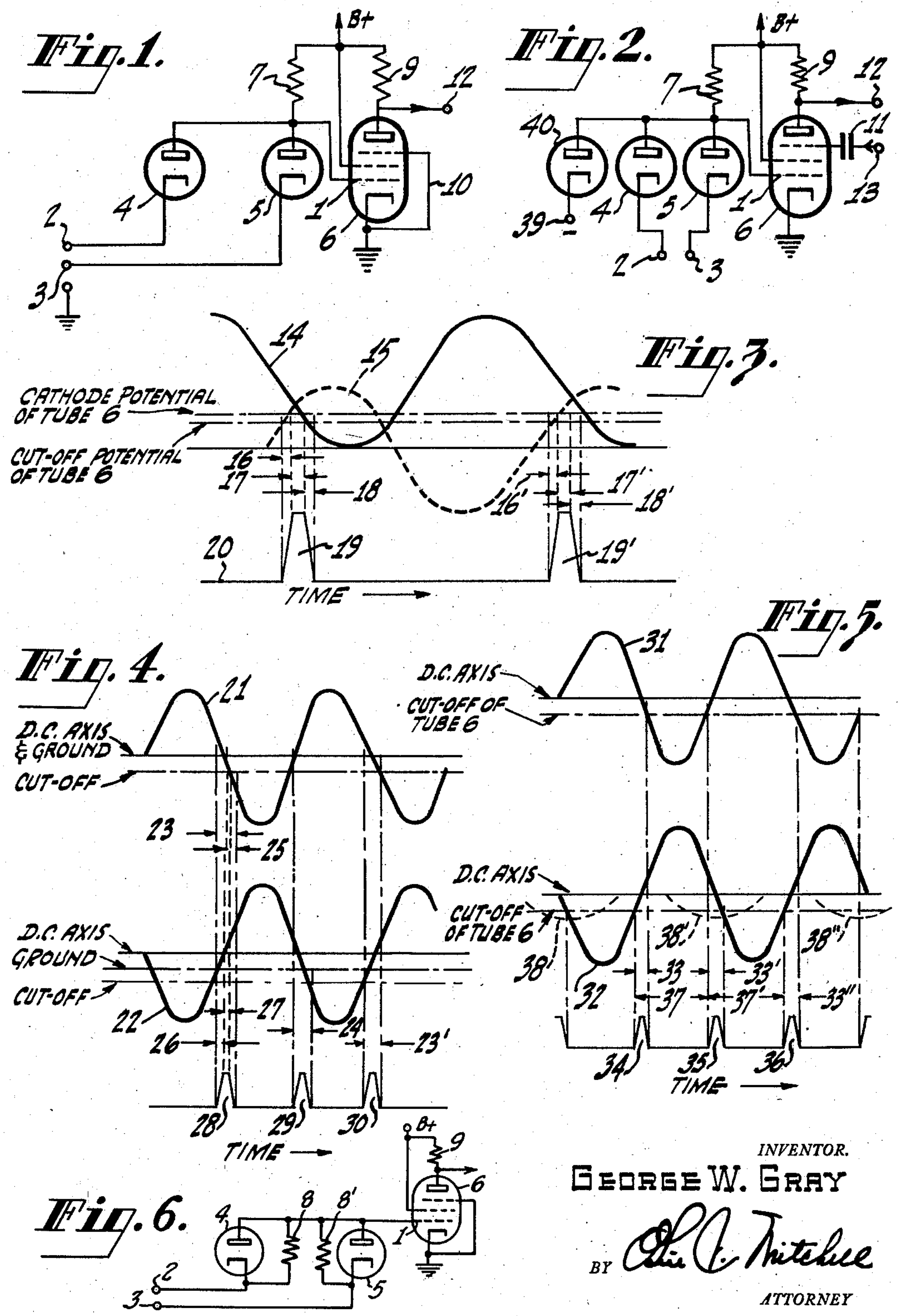
Figure 1 shows by circuit diagram, one form of the invention.
Figure 2 shows a schematic diagram of another embodiment of the invention.

Figure 3 contains curves explanatory of the operation of Figures 1 and 2;

Figure 4 contains curves explanatory of another method of operation of the apparatus of Figures 1 and 2;

Figure 5 comprises curves depicting an operating condition of the apparatus of Figure 2 wherein frequency doubling takes place; and Figure 6 shows an alternative form of the circuit of Figure 1.

Figures 1 and 3 will be considered together in explaining the operation of the invention wherein two sine waves having the same frequency but different phases are employed. Curves 14 and 15 represent respectively a leading sine wave and a lagging sine wave, which may be as high as several megacycles in frequency. These two sine waves are applied respectively to input terminals 2 and 3, the input circuit including a point of reference potential such as ground. The terminals 2 and 3 are coupled to the cathodes of unidirectional current conducting devices or diodes 4 and 5 respectively. The plates of diodes 4 and 5 are coupled together and to the grid 1 of a current conducting device or vacuum tube 6. It is essential that a resistance be included in the grid circuit to permit electrons to be removed from the grid 1. Such a resistance may be placed between B+ and the plate of diode 5 as illustrated by resistance 7. However, this resistance could alternatively be inserted between the plate of either diode 4 or 5 and one or both of the input terminals 2 and 3 as shown by the resistances 8 and 8' in Figure 6. If the diodes 4 and 5 are crystal diodes, it is possible to dispense entirely with the external resistance 7. Resistance 9 is a load resistance. Terminal 12 represents a point from which the output pulses may be taken off. The plates of diodes 4 and 5 are so connected with the grid of tube 6 that unless the cathodes of the diodes 4 and 5 are both above the cutoff potential of tube 6, tube 6 will not conduct. In effect the grid of tube 6 is so connected that it will always be at the potential which is the more negative of the two potentials on the plates of the diodes 4 and 5 respectively. If the cathode of diode 4 is more positive than the cathode of diode 5, diode 5 will conduct and hold the grid of tube 6 at the potential on the cathode of diode 5. During this period diode 4 is non-conductive and is an open circuit since its plate is more negative than its cathode. If the cathodes of both diodes 4 and 5 are positive with respect to the cathode of tube 6, both diodes are open circuits because of the grid current drawn by tube 6.

Figure 3 shows graphically the conditions requisite for the production of sharp pulses when fed by sine waves out of phase appreciably less than 180°. Since both cathodes of diodes 4 and 5 must be above cutoff at the same time for current to be drawn through tube 6, as has been explained above, there is only one region per cycle of each of the sine waves in which a pulse can be produced. Interval 16 which corresponds to the rise time of the current pulse 19, begins when curve 15 starts to exceed the cutoff potential of tube 6 as shown. It ends when curve 15 exceeds the cathode potential of tube 6. The interval 17 corresponding to the flat top portion of pulse 19 begins when curve 15 exceeds the cathode potential of tube 6 and ends when curve 14 drops below the cathode potential. The interval 18, corresponding to the fall time of the pulse 19, begins when the curve 14 intersects the cathode potential line and ends when the curve 14 dips below the cutoff potential line. Pulse 19′ corresponds to the next occurrence of a pulse as generated by this apparatus. Numerals 16′, 17′ and 18′ relate to intrevals corresponding to 16, 17 and 18.

It is seen that a shift in the mutual phase of the waves 14 and 15 may be used to either lengthen or shorten the time base of the pulses 19 and 19′. It is also possible to affect the width by changing the D.-C. level of one or both of the sine waves 14 and 15.

The arrangement of Figure 1 possesses two advantages over other types of circuits in which the input waves might be combined resistively, for example. Since there are two diodes 4 and 5 there is not so much interaction between them as there would be with such an alternative resistive coupling. When either cathode of diodes 4 and 5 goes positive with respect to ground, that diode is effectively an open circuit. This means that with respect to the source of the input sine waves, the open diode would have little effect. If the source were a resonant circuit, for example, which was "rung" periodically by injection of a wave having a given frequency, and that source were coupled directly to the grid of the pulse producing tube, when the grid went positive current would be drawn and the pulse producing tube would present a very small impedance to the resonant circuit. This would mean that the ringing oscillations in the resonant circuit would be damped out prematurely and the effectiveness of the resonant circuit would be considerably impaired.

Although the apparatus of Figure 1 when employed with sine waves such as 14 and 15 gives quite satisfactory results, it is possible to use sine waves which are out of phase by 180° and achieve comparable results, or frequency doubling if desired. In Figure 4 wave 21 is 180° out of phase with respect to wave 22 and also has a D.-C. axis which is the same as ground. This D.-C. axis is positive with respect to cutoff of tube 6 by an amount less than the D.-C. axis of wave 22. Pulses 28 and 30 are produced within a time interval 23 and 23′ respectively. During this time, portions of wave 21 and wave 22 are above cutoff. During the interval 26, curve 22 exceeds cutoff and so does curve 21. Therefore, current will begin to flow through tube 6. During the interval 27, curve 22 exceeds the ground potential and attains its D.-C. axis, thus forming the flat top portion of curve 28. During the interval 25, curve 21 begins to fall below ground and its D.-C. axis until it intersects with the cutoff line which marks the termination of the fall time of the pulse 28. Since the operation of the apparatus in producing pulse 30 is analogous to the operation for producing pulse 28, detailed explanation therefor will be dispensed with.

The intermediate pulse 29, however, is produced during an interval 24 which corresponds to the time when curve 21 begins to exceed cut off on the positive slope of its positive half cycles to the time when curve 22 drops below cutoff. Thus, for each cycle of the waves 21 and 22, two pulses will be produced.

The intermediate pulse 29 and others formed similarly are not equidistant from pulses 28 and 30. If the intermediate pulse is exactly equidistant, then the output pulses would have a frequency double that of the input sine waves. It is seen that through the use of the apparatus of Figure 1 two pulses per cycle will be produced, but that the second or intermediate pulse may or may not occur at a time exactly midway between two pulses such as pulses 28 and 30.

To insure the occurrence of the intermediate pulse at the correct point of time necessary for effective frequency doubling, the input sine waves may be applied to the control electrode of tube 6 under the conditions illustrated by Figure 5. Curves 31 and 32 represent two input sine waves having opposite polarities. The D.-C. axes of both waves are at the same level and the cutoff level of tube 6 is negative with respect to the common D.-C. axis as shown. Hence, it is seen that during the intervals 33, 33′ and 33″, corresponding pulses 34, 35 and 36 are produced by tube 6. During these intervals the values of curves 31 and 32 are above cutoff so that tube 6 is conductive. It should be further noted that the interval 37 is exactly equal to the interval 37′. Therefore, pulse 35 may be considered as the pulse intermediate pulses 34 and 36 so that true frequency doubling is achieved.

Figures 2 and 5 also illustrate an instance wherein the formation of the intermediate pulses such as pulse 35 is prevented. In this case it is necessary only to provide a means for keeping control grid 1 negative with respect to cutoff during the interval 33′ or during the interval of whatever pulse is to be removed. Such a signal is illustrated by half cycles 38, 38′ and 38″ in Figure 5. As shown these half cycles resemble parts of a sine wave, but it is to be understood that it is possible to employ a signal of any shape so long as it is below cutoff during the intermediate interval 33′ and similar alternate intervals, or during a particular desired interval. Figure 2 shows how this cancelling signal 38, 38′ and 38″ can be applied, for example, to input terminal 39 which is coupled to the cathode of diode 40. Diode 40 has its anode coupled to the anodes of diodes 4 and 5 and is thus capable of affecting the potential on grid 1 in the same fashion as diodes 4 and 5. During intervals like 33′ the signal 38′ will make the grid 1 of tube 6 negative so that the latter is non-conductive. The pulse or signal applied to diode 40 need not have any particular periodicity or regular rate of occurrence, and may be applied in response to some additional keying factor in the system.

Figure 2 also shows how this apparatus may be used in sampling applications. The information to be sampled may be applied to terminal 13 through coupling condenser 11 to the suppressor grid of tube 6. Only when a pulse is produced by tube 6 in response to two or more input sine waves is the tube 6 conductive and hence only that portion of the information wave occurring during that interval will appear at the output terminal 12. It is to be noted that this sampling may be accomplished equally well with the types of input sine waves illustrated in Figures 3, 4 or 5.

Having thus described the invention, what is claimed is:

1. Frequency doubling apparatus comprising, in combination, a current conducting device having input, output and reference electrodes, a terminal to which a unidirectional potential of one polarity is applied, a resistor coupling said output electrode to said terminal, a second resistor coupling said input electrode to said terminal, means to connect a point of reference potential to said reference electrode, first and second unidirectional current conducting devices each having a cathode and anode, means connecting said anodes together and directly to said input electrode, means to apply a sine wave to one of said cathodes, and means to apply to said other cathode a second sine wave having the same frequency and D.-C. axis as said first sine wave but being 180° out of phase therewith.

2. Frequency doubling apparatus comprising, in combination, a current conducting device having input, output and reference electrodes, a terminal to which a unidirectional potential of one polarity is applied, a resistor coupling said output electrode to said terminal, a second resistor coupling said input electrode to said terminal, means to connect a point of reference potential to said reference electrode, first and second unidirectional current conducting devices each having a cathode and anode, means connecting said anodes together and directly to said input electrode, means to apply a periodic wave to one of said cathodes, and means to apply to said other cathode a second periodic wave having the same frequency and D.-C. axis as said first wave but being 180° out of phase therewith.

References Cited in the file of this patent

UNITED STATES PATENTS

| | | |
|---|---|---|
| 2,190,504 | Schlesinger | Feb. 13, 1940 |
| 2,519,763 | Hoglund | Aug. 22, 1950 |
| 2,527,474 | Alvarez | Oct. 24, 1950 |
| 2,557,729 | Eckert | June 19, 1951 |
| 2,568,099 | Townsley | Sept. 18, 1951 |
| 2,590,514 | Dehn et al. | Mar. 25, 1952 |
| 2,643,820 | Williams et al. | June 30, 1953 |
| 2,748,283 | Merrill et al. | May 29, 1956 |

FOREIGN PATENTS

| | | |
|---|---|---|
| 665,913 | Great Britain | Feb. 6, 1952 |

OTHER REFERENCES

Article entitled "Electronics for Cosmic-Ray Experiments," by Schroeder and Shipman, Jr., Review of Scientific Instruments, vol 18, No. 8, August 1947, pages 551–556.